US005353489A

United States Patent [19]

Weaver

[11] Patent Number: 5,353,489

[45] Date of Patent: Oct. 11, 1994

[54] CONSTANT VELOCITY JOINT BOOT POSITIONING DEVICE

[76] Inventor: Bruce W. Weaver, 412 W. Butternut Rd., Summerville, S.C. 29483

[21] Appl. No.: 30,810

[22] Filed: Mar. 12, 1993

[51] Int. Cl.[5] ................ B23P 19/02

[52] U.S. Cl. ................ 29/235; 29/280

[58] Field of Search ................ 29/235, 234, 422, 448, 29/450, 789, 797, 270, 278, 280

[56] References Cited

U.S. PATENT DOCUMENTS 4,206,538 6/1980 Hayes ................ 29/235
4,564,988 1/1986 Norrod ................ 29/235
4,713,869 12/1987 Pool ................ 29/275
5,008,994 4/1991 Rettig et al. ................ 29/235

*Primary Examiner*—Robert C. Watson

*Attorney, Agent, or Firm*—W. Alex Dallis, Jr.

[57] ABSTRACT

A device for positioning a flexible constant velocity joint boot to a shaft. A sleeve comprises a cylindrical portion enveloping the outer constant velocity joint and a conical portion receiving the drive shaft. A flexible constant velocity joint boot for enclosing the open end of the constant velocity joint is attached inside one end of an elongate cylinder. A coarsely textured strip disposed around a raised lip defined around the exterior edge of the cylinder engages the collar region of the boot and the boot and cylinder are slid over the sleeve by a handle attached to the other end of the cylinder. The boot expands over the sleeve, and hence over the outer constant velocity joint, and engages the drive shaft on the other side of the outer constant velocity joint.

12 Claims, 2 Drawing Sheets

CONSTANT VELOCITY JOINT BOOT POSITIONING DEVICE

FIELD OF THE INVENTION

This invention relates generally to front wheel drive vehicles and most specifically to a device for positioning a flexible constant velocity joint boot to a shaft.

BACKGROUND OF THE INVENTION

From time to time, the constant velocity joints on front wheel drive vehicles must be serviced. This process requires the flexible boot to be slid from the constant velocity joint onto the drive shaft while the bearings located inside the joint are cleaned, lubricated or otherwise replaced. The boot comprises a resiliently flexible rubber material and protects the bearings from dirt and moisture. If the condition of the old boot is satisfactory it is replaced on the joint; however, if a new boot is required the outer constant velocity joint must be removed and a new boot is slid onto the drive shaft. The joint is replaced and the new boot is attached thereto. Another method of replacing the boot has been to stretch the boot by hand over a cone-shaped member slid over the outer constant velocity joint. For this application, it is required that the cone-shaped member be lubricated to facilitate the passage of the boot. By either method, replacing the boot has proved to be time consuming for the automobile technician and quite costly for the consumer since heretofore it has been impossible to swiftly replace a boot without either removing the outer constant velocity joint or engaging in a stretching of the boot by hand over the outer constant velocity joint.

Numerous patents have been granted for tools of one sort or another which engage and disengage constant velocity joint boots. U.S. Pat. No. 4,564,988 to Norrod discloses an apparatus which attaches a boot to a universal joint wherein the universal joint must first be removed before the boot is positioned on the drive shaft. In U.S. Pat. No. 4,713,869 to Pool a tool is described which attaches and detaches a boot from a universal joint. U.S. Pat. No. 5,008,994 Retigg et al. discloses an expanding device which enlarges the diameter of a boot such that it may be fitted on a propeller shaft.

While these devices perform well for their intended applications, the art does not provide a device for positioning a flexible constant velocity joint boot to the drive shaft of a front wheel drive vehicle while the outer constant velocity joint and drive shaft remain in place. Additionally, the art does not provide such a device which instantaneously positions a flexible boot on a shaft without need for lubricants or a stretching of the boot by hand.

SUMMARY OF THE INVENTION

It is therefore an object of this invention to provide a device which will instantaneously position a flexible constant velocity joint boot to a shaft.

It is a further object of this invention to provide a device which will position a flexible constant velocity joint boot to the drive shaft while the outer constant velocity joint and drive shaft remain in place.

It is a still further object of this invention to provide a device which will stretch a flexible constant velocity joint boot over the outer constant velocity joint without lubricants or a stretching of the boot by hand.

These as well as other objects are accomplished by a device for positioning a flexible constant velocity joint boot to a shaft. A sleeve comprises a cylindrical portion enveloping the outer constant velocity joint and a conical portion receiving the drive shaft. A flexible constant velocity joint boot for enclosing the open end of the constant velocity joint is attached inside one end of an elongate cylinder. A coarsely textured strip disposed around a raised lip defined around the exterior edge of the cylinder engages the collar region of the boot and the boot and cylinder are slid over the sleeve by a handle attached to the other end of the cylinder. The boot expands over the sleeve, and hence over the outer constant velocity joint, and engages the drive shaft on the other side of the outer constant velocity joint.

DETAILED DESCRIPTION

Figure 1:
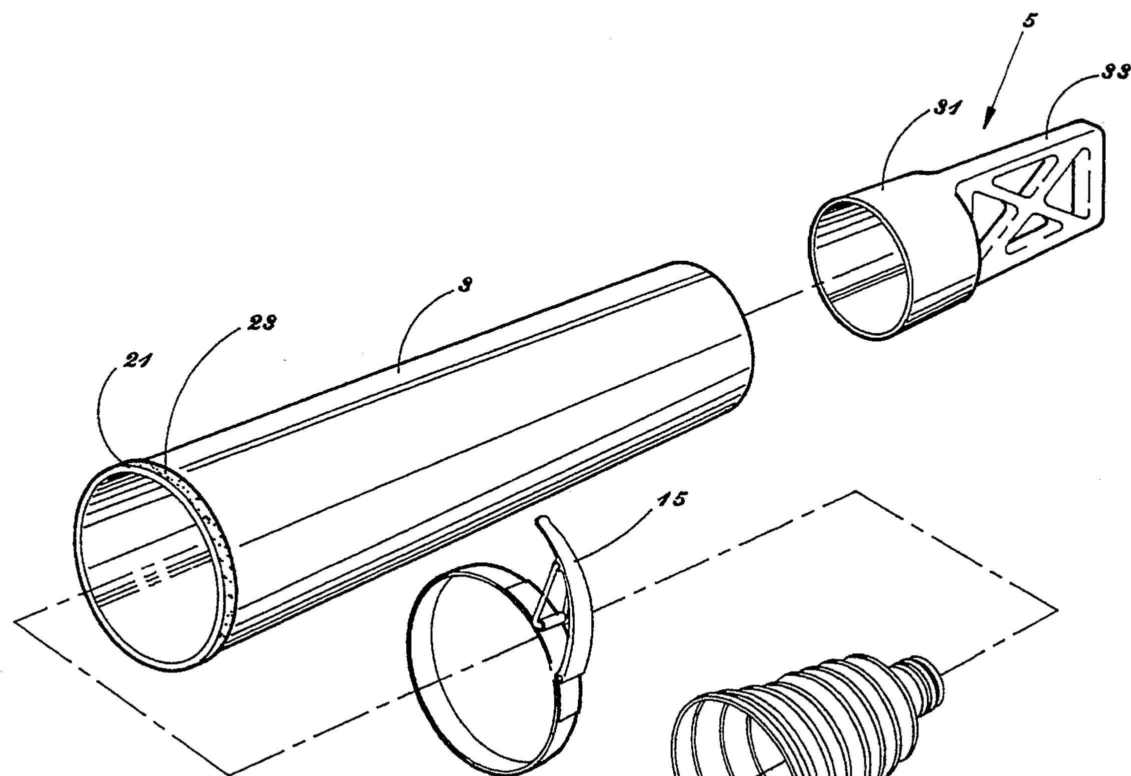
FIG. 1 of the drawings illustrates a perspective view of a constant velocity joint boot positioning device comprising a sleeve, an elongate cylinder and a handle.

FIG. 1 illustrates a constant velocity joint boot positioning device comprising sleeve 1, elongate cylinder 3, handle 5, and clamp 15.

Designed for positioning over the outer constant velocity joint and drive shaft of a front wheel drive vehicle, sleeve 1 is formed of a single piece of rigid polymeric material defining a cylindrical portion 7 and a conical portion 9.

Figure 1A:
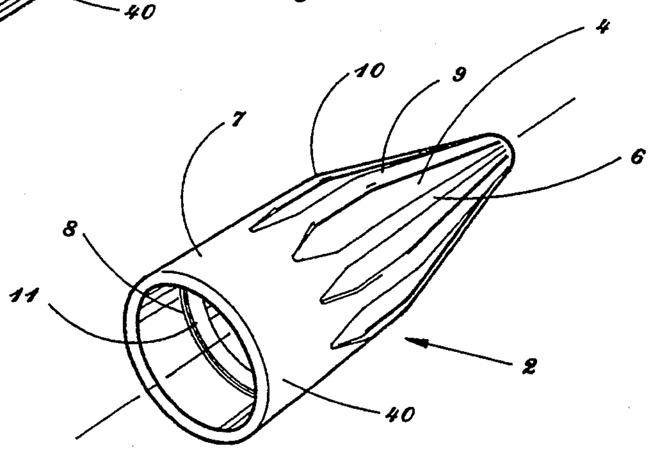
FIG. 1*a* of the drawings illustrates a perspective view of a sleeve having a plurality of lengthwise ribs.

FIG. 1*a* illustrates sleeve 2 identical in design to sleeve 1 but including a plurality of narrow ribs 6 rounded at the apexes thereof and extending in lengthwise fashion from the closed end of conical portion 9 and terminating generally between the mid-point and the open end of cylindrical portion 7. Narrow ribs 6 define therebetween cavities 4.

Figure 2A:
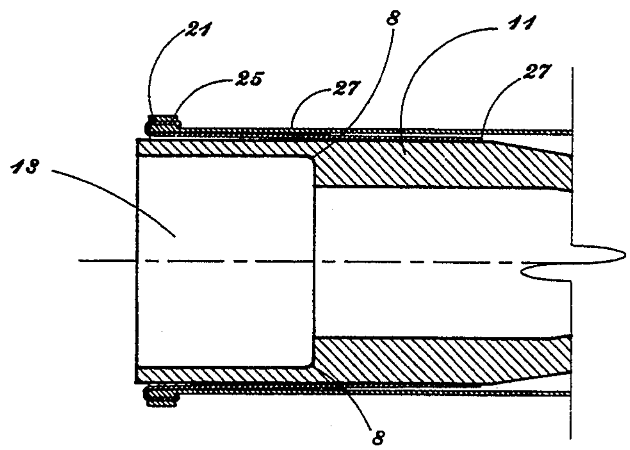
FIG. 2*a* of the drawings illustrates an expanded cros-ssectional view of a flexible constant velocity joint stretching over the sleeve as shown in FIG. 2.
Figure 2:
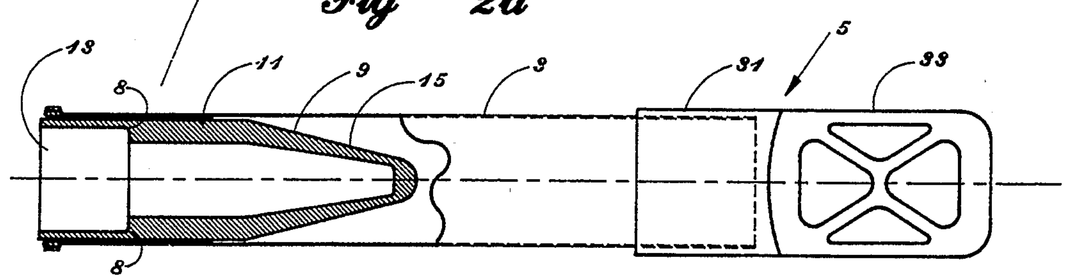
FIG. 2 of the drawings illustrates a cross-sectional view of a flexible constant velocity joint boot stretching over the sleeve.
Figure 4:
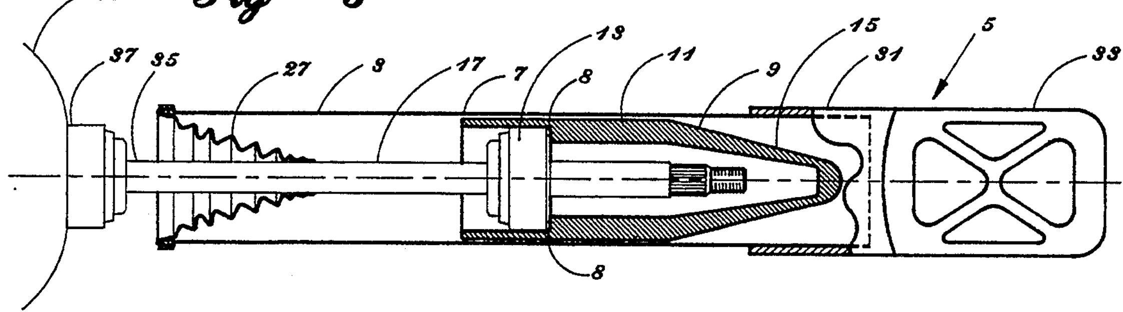
FIG. 4 of the drawings illustrates a partial side, partial cross-sectional view of a flexible constant velocity joint boot positioned on a drive shaft of a front wheel drive vehicle.

FIGS. 2 and 4 illustrate a cross-sectional view of interior wall 11 of sleeves 1 and 2. Interior wall 11 becomes substantially thicker such that interior lip 8 is formed at a point generally between the mid-point and the open end of cylindrical portion 7. Interior wall 11 maintains uniform thickness to juncture 10 of cylindrical portion 7 and conical portion 9, then interior wall 11 gradually tapers to the closed end of conical portion 9. Sleeves 1 and 2 are fashioned to prevent a backward sliding of flexible constant velocity joint boot 27 when it is stretched over the outside surface of either sleeve 1 or 2, as will be described in due course. The substantial thickness of interior wall 11 allow sleeves 1 and 2 to resist breakage when dropped or mishandled.

Referring back to FIG. 1 and to FIG. 2*a*, elongate cylinder 3 has a bore extending therethrough from a first end to a second end for closely sliding over sleeve 1. Located on the first end of elongate cylinder 3 is raised lip 21 over which coarsely textured strip 23 is attached for engaging the collar region 25 of flexible constant velocity joint boot 27. It is noted that strip 23 is purchased off-the-shelf and discarded and replaced as needed.

Figure 3:
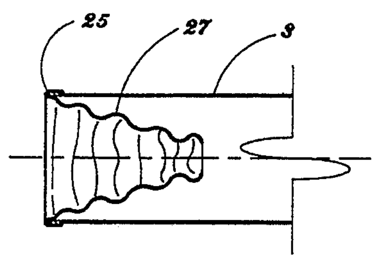
FIG. 3 of the drawings illustrates a cross-sectional view of a flexible constant velocity joint boot releasably attached to one end of the elongate cylinder.

During assembly of the device, handle 5 is attached to elongate cylinder 3. Handle 5 comprises cylindrical end 31 and gripping end 33 which is substantially rectangular in crosssection. Gripping end 33 includes a plurality of triangular slots 34 accommodating the fingers. Cylindrical end 31 closely receives the second end of elongate cylinder 3, as illustrated in FIG. 2. Now, flexible constant velocity joint boot 27 is attached to the first end of elongate cylinder 3, as best illustrated in FIGS. 2*a* and 3. This is accomplished by inserting boot 27 inside elongate cylinder 3 and folding collar region 25 over coarsely textured strip 23. The rough surface of strip 23 engages and holds the rubber such that boot 27 is fixedly held inside elongate cylinder 3. Clamp 15, illustrated in FIG. 1, is used if strip 23 is worn or absent or it may be used in combination with strip 23 to provide additional securance of boot 27 to elongate cylinder 3. The clamp illustrated here is similar to those heretofore utilized such as a screw- or clamp-type fastener. If the outside constant velocity joint boot is to be replaced, boot 27 is turned inside out, inserted into elongate cylinder 3 and attached to strip 23. Conversely, if the inside constant velocity joint boot is to be replaced, the boot is inserted right side out then attached to strip 23.

During operation the tire assembly is, of course, removed and either sleeve 1 or 2 is positioned over outer constant velocity joint 13 and drive shaft 17 such that the outside face of joint 13 squarely abuts interior lip 8 and drive shaft 17 extends into conical portion 9, as illustrated in FIGS. 2, 2*a* and 4. Next, the technician clutches gripping end 33 attached to elongate cylinder 3 in which boot 27 has been affixed and slides elongate cylinder 3 over sleeve 1 or 2. As illustrated in FIGS. 2 and 2*a*, being extremely deformable, boot 27 flattens and stretches over sleeve 1 or 2. The exterior design of sleeves 1 and 2 give the technician total control of boot 27 because it prevents boot 27 from regaining its shape as it stretches over sleeve 1 or 2. Specifically, conical portion 9 defining a gradually increasing outside diameter facilitates in stretching boot 27 and cylindrical portion 7, since it is of uniform outside diameter, holds boot 27 in a stretched position. Additionally, as previously disclosed, sleeve 2 includes narrow ribs 6 defining therebetween cavities 4. Ribs 6 raise portions of boot 27 and cavities 4 reduce friction by removing the planer surface over which boot 27 would normally stretch. Smooth surface 40, having no ribs or cavities, provides an area of friction which deters boot 27 from backsliding off sleeve 2. Similarly, the outside surface of sleeve 1 provides a uniform area of friction as to prevent boot 27 from regressing.

FIG. 4 illustrates a front wheel drive assembly including engine 35 and inside constant velocity joint 37. As shown, elongate cylinder 3 and boot 27 have slid over sleeve 1 or 2 and boot 27, having regained its original shape, has engaged drive shaft 17. Now, the technician will attach boot 27 to either outer constant velocity joint 13 or inside constant velocity joint 37.

As various modifications occur to those familiar with the art, such modifications may occur without in any way departing from the spirit and scope of the following appended claims.

That which is claimed is:

1. A device for positioning a flexible constant velocity joint boot to a shaft, said device comprising:

a. a conical sleeve being of sufficient interior diameter to allow it to cover the outside constant velocity joint and the end of the drive shaft protruding from the outside constant velocity joint;

b. stretching means, roughly circular in cross-section, for expanding a flexible constant velocity joint boot over said sleeve, said stretching means being of sufficient interior diameter to slide over said sleeve and the outside constant velocity joint;

c. handle means attached to said stretching means.

2. The device as defined in claim 1 wherein said stretching means comprises an elongate cylinder having a bore extending therethrough from a first end to a second end, said elongate cylinder having a raised lip defined around the exterior edge of said first end.

3. The device as recited in claim 2 further comprising a strip of coarsely textured material affixed to said lip for engaging the collar region of a constant velocity joint boot.

4. The device as recited in claim 1 wherein said sleeve comprises:

a. a first cylindrical portion of sufficient interior diameter to slide closely over the outside constant velocity joint;

b. a second cylindrical portion attached to the outside end of said first cylindrical portion such that there is formed at the juncture of the first cylindrical portion and the second cylindrical portion a lip which rests on the outside face of the outside constant velocity joint.

5. The device as recited in claim 1 wherein said sleeve comprises:

a. a first cylindrical portion of sufficient interior diameter to slide closely over the outside constant velocity joint;

b. a second cylindrical portion attached to the outside end of said first cylindrical portion such that there is formed at the juncture of the first cylindrical portion and the second cylindrical portion a lip which rests on the outside face of the outside constant velocity joint;

c. a conical portion tapering to the end thereof and being of sufficient diameter and dimension to allow the drive shaft to extend therein but not through the end of said conical portion.

6. The device as recited in claim 5 wherein the exterior surface of said sleeve is encircled by a plurality of narrow ribs rounded at the apexes thereof and extending in lengthwise fashion from the end of said conical portion and terminating at a point generally between the open end and the mid-point of said first cylindrical portion, said narrow ribs defining cavities therebetween.

7. The device as recited in claim 3 further comprising a sleeve defining:

a. a first cylindrical portion of sufficient interior diameter to slide closely over the outside constant velocity joint;

b. a second cylindrical portion of smaller interior diameter forming inside said first cylindrical portion a lip resting on the outside face of the outside constant velocity joint, said second cylindrical portion being of sufficient interior diameter to allow the drive shaft to extend therethrough;

c. a conical portion tapering to the end thereof.

8. The device as recited in claim 7 wherein the exterior surface of said sleeve is encircled by a plurality of narrow ribs rounded at the apexes thereof and extending in lengthwise fashion from the end of said conical portion and terminating at a point generally between the open end and the mid-point of said first cylindrical portion, said narrow ribs defining cavities therebetween.

9. The device as recited in claim 3 wherein said handle means further comprises:

a. a cylindrical end for closely receiving one end of said stretching means;

b. a gripping end substantially rectangular in crossection and including on the front, rear, upper and lower portions thereof a plurality of slots accommodating the fingers.

10. The device as recited in claim 9 wherein said sleeve further comprises:

a. a first cylindrical portion of sufficient interior diameter to slide closely over the outside constant velocity joint;

b. a second cylindrical portion of smaller interior diameter forming inside said first cylindrical portion a lip resting on the outside face of the outside constant velocity joint, said second cylindrical portion being of sufficient interior diameter to allow the drive shaft to extend therethrough;

c. a conical portion tapering to the end thereof.

11. The device as recited in claim 10 wherein said sleeve is encircled by a plurality of narrow ribs rounded at the apexes thereof and extending in lengthwise fashion from the end of said conical portion and terminating at a point generally between the open end and the midpoint of said first cylindrical portion, said narrow ribs defining cavities therebetween.

12. The device as recited in claim 11 further comprising a circular clip for attaching a constant velocity joint boot to the raised lip defined around the exterior edge of the first end of said elongate cylinder.

* * * * *